(12) United States Patent
Bonigen et al.

(10) Patent No.: US 9,822,905 B2
(45) Date of Patent: Nov. 21, 2017

(54) PROCESS AND DEVICE FOR LAYING A PIPE-IN-PIPE

(71) Applicant: ITP SA, Louveciennes (FR)

(72) Inventors: Christian Bonigen, Carrières sous Poissy (FR); Christian Geertsen, Versailles (FR)

(73) Assignee: ITP SA, Louveciennes (FR)

( * ) Notice: Subject to any disclaimer, the term of this patent is extended or adjusted under 35 U.S.C. 154(b) by 259 days.

(21) Appl. No.: 14/564,239

(22) Filed: Dec. 9, 2014

(65) Prior Publication Data

US 2015/0159775 A1 Jun. 11, 2015

(30) Foreign Application Priority Data

Dec. 10, 2013 (FR) ..................................... 13 02880

(51) Int. Cl.
*F16L 1/12* (2006.01)
*F16L 1/225* (2006.01)
*F16L 1/235* (2006.01)
*F16L 1/23* (2006.01)
*F16L 1/26* (2006.01)
*F16L 1/18* (2006.01)
*F16L 59/065* (2006.01)
*F16L 1/19* (2006.01)
*B63B 35/03* (2006.01)
*F16L 1/16* (2006.01)
*F16L 59/14* (2006.01)

(52) U.S. Cl.
CPC ............... *F16L 1/18* (2013.01); *B63B 35/03* (2013.01); *F16L 1/165* (2013.01); *F16L 1/19* (2013.01); *F16L 1/235* (2013.01); *F16L 59/065* (2013.01); *F16L 59/143* (2013.01)

(58) Field of Classification Search
CPC ..... F16L 1/00; F16L 1/205; F16L 1/225; F16L 1/203; F16L 1/26; F16L 1/036; F16L 1/161; E02F 5/104; B63B 35/03
USPC .......................................... 405/154.1–184.5
See application file for complete search history.

(56) References Cited

U.S. PATENT DOCUMENTS

| | | | | |
|---|---|---|---|---|
| 2,050,985 | A * | 8/1936 | Trickey | F16L 41/002 137/15.08 |
| 2,651,329 | A * | 9/1953 | Fowler, Jr. | F16L 55/168 138/97 |
| 3,168,908 | A * | 2/1965 | Steinsberger | F16L 55/16455 138/93 |
| 3,459,229 | A * | 8/1969 | Croft | G01M 3/022 138/109 |
| 4,171,142 | A * | 10/1979 | Harrison | F16L 55/175 138/99 |
| 4,466,273 | A * | 8/1984 | Pillette | E21B 33/03 73/40.5 R |

(Continued)

*Primary Examiner* — Amber R Anderson
*Assistant Examiner* — Edwin J Toledo-Duran
(74) *Attorney, Agent, or Firm* — Oliff PLC (57) ABSTRACT

The invention concerns a process and a device for laying a subsea pipeline according to the J-lay or S-lay method wherein straight sections are mounted onshore, dried and degassed then closed by plugs. The sections are loaded on a pipe-laying ship, are separated from their plugs before the welding. At the welding of each bulkhead a short pumping is operated to reduce the pressure in the part of the annulus located between the two last bulkheads and then the opening leading to the annulus are sealed.

10 Claims, 5 Drawing Sheets

(56) References Cited

U.S. PATENT DOCUMENTS

| | | | | |
|---|---|---|---|---|
| 4,756,338 A * | 7/1988 | Guyatt | F16L 55/172 | 138/99 |
| 5,447,339 A * | 9/1995 | Marchal | F16L 59/20 | 285/114 |
| 6,050,613 A * | 4/2000 | Wartluft | F16L 37/092 | 138/89 |
| 6,179,523 B1 * | 1/2001 | Langner | F16L 1/19 | 405/158 |
| 6,217,688 B1 * | 4/2001 | Landers | F16L 55/16 | 138/99 |
| 6,361,080 B1 * | 3/2002 | Walsh | F16L 23/024 | 285/222.1 |
| 6,446,670 B1 * | 9/2002 | Woodward | B29C 63/36 | 138/97 |
| 6,467,811 B2 * | 10/2002 | Mitchell | F16L 23/003 | 285/114 |
| 6,513,551 B2 * | 2/2003 | Louis | F16L 9/18 | 138/108 |
| 6,612,341 B2 * | 9/2003 | Vu | F16L 55/172 | 138/158 |
| 6,884,373 B1 * | 4/2005 | Johnson | F16L 41/06 | 138/99 |
| 6,886,388 B1 * | 5/2005 | McGill | F16L 47/03 | 138/90 |
| 6,899,138 B2 * | 5/2005 | Lundman | F16L 55/134 | 138/93 |
| 7,000,890 B2 * | 2/2006 | Bell | E21B 33/0355 | 251/129.15 |
| 7,100,946 B2 * | 9/2006 | Giacomelli | F16L 1/20 | 285/123.1 |
| 7,118,137 B2 * | 10/2006 | Deremiah | F16L 21/035 | 285/305 |
| 7,431,341 B2 * | 10/2008 | McIntyre | F16L 13/0263 | 285/370 |
| 7,523,644 B2 * | 4/2009 | Van Winkle | G01M 3/2853 | 73/37 |
| 7,975,726 B2 * | 7/2011 | Kiest, Jr. | F16L 55/1651 | 138/97 |
| 8,141,218 B2 * | 3/2012 | Van Zandwijk | F16L 9/18 | 285/123.1 |
| 8,555,930 B2 * | 10/2013 | Pionetti | F16L 1/18 | 138/109 |
| 2003/0017007 A1 * | 1/2003 | Bass | F16L 1/16 | 405/154.1 |
| 2005/0212285 A1 * | 9/2005 | Haun | F16L 9/18 | 285/123.1 |
| 2006/0065320 A1 * | 3/2006 | Borland | F16L 55/175 | 138/99 |
| 2007/0056383 A1 * | 3/2007 | Deeg | G01N 33/383 | 73/788 |
| 2007/0113622 A1 * | 5/2007 | Buckley | G01M 3/2823 | 73/49 |
| 2007/0284872 A1 * | 12/2007 | Pionetti | F16L 1/19 | 285/55 |
| 2010/0282353 A1 * | 11/2010 | Baylot | F16L 9/18 | 138/114 |

* cited by examiner

PROCESS AND DEVICE FOR LAYING A PIPE-IN-PIPE

BACKGROUND OF THE INVENTION

1. Field of the Invention

The technical scope of the present invention is that of laying methods and devices for pipes intended to transport fluids such as pipelines for the transport of hydrocarbons.

2. Description of the Related Art

The Pipe-in-Pipe concept is well known and is namely presented in the form of straight sections assembled end to end. Reinforcement rings, named bulkheads, are evenly spaced along the pipe between two sets of sections so as to link the two casings axially.

Each section comprises an inner pipe arranged coaxially in an outer pipe. A thermal insulating system additionally enables the two pipes, able to slide with respect to one another, to be positioned. The inner pipe is linked, by welding, to the inner casing of the portion of pipe already in place and then the outer pipe is linked by welding to the outer casing. The bulkheads rigidify the pipe and compartmentalize the annulus into several parts each extending for a length of, for example, 500 m to 3 km. The bulkheads are thus typically spaced with respect to one another by 500 m to 3 km.

The pipes constituting each section are made of metal and the positioning and thermal insulation system comprises, for example, flexible panels of a material that is sufficiently resistant to bear the weight of the pipes, such as IZOFLEX® or other material incorporating pyrogenic silica. The positioning and thermal insulation system may also comprise spacers, for example made of a polymer, wood or metal, to ensure the concentric alignment as well as a filling material to ensure the thermal insulation. Each section extends, for example, for a length of around 12 m, 24 m, 48 m, 72 m or 96 m.

The fact of positioning insulating material between the two pipes advantageously thermally insulates the inner pipe. One problem is, however, that for the thermal insulation to be optimal, the pressure must be reduced in the space in which the insulation is arranged. However, this operation takes time because of the high degassing times for the materials and surfaces facing the annulus space. Thus, when the sections are laid, by a pipe-laying ship using the S-lay or J-lay method, the pressure reducing operation is generally omitted because of the lack of available time when the pipeline is being laid.

There is thus a need to improve the laying of pipe-in-pipe pipelines constituted by straight sections with an annulus that is compartmentalized by bulkheads so as to provide better thermal insulation.

SUMMARY OF THE INVENTION

The aim of the present invention is to overcome the drawbacks of prior art by supplying a new laying process for such a sub-sea pipeline.

This aim is reached by a laying process according to the J-lay or S-lay method for a subsea pipeline used to transport a fluid and which comprises an inner casing arranged coaxially in an outer casing, thereby delimiting an annulus, the pipeline being formed of straight sections, the process comprising:

mounting the sections onshore, each section comprising an inner pipe coaxially arranged using positioning and thermal insulation elements inside an outer pipe, loading the sections onto a J-lay or S-lay method pipe-laying ship, welding the sections end to end, at sea, in order to form the portions of pipeline, bulkheads being welded between the portions of pipeline, the bulkheads delimiting, between each other, closed parts of annulus, wherein prior to loading the sections onto the pipe-laying ship, the process comprises the steps of:

drying and degassing the space between the inner pipe and the outer pipe of each section then, placing two plugs at the ends of each section to temporarily close at least the space between the inner pipe and the outer pipe, and wherein the process comprises the step of removing the plugs before welding the sections together, and wherein, after the welding of at least one of the bulkheads, the process comprises a short pumping operation to reduce the pressure in the part of the annulus located between this bulkhead and the previously installed bulkhead, via at least on opening made facing this part of the annulus, and sealing said opening facing this part of the annulus.

According to a particularity of the present invention, each of the parts of the annulus located between the successive bulkheads is put under low pressure by a short pumping operation.

According to another particularity of the present invention, the drying and degassing of each section prior the loading onto the pipe-laying ship is made by pumping the air from the space between the inner pipe and the outer pipe.

According to another particularity of the present invention, the air pumping operation is performed simultaneously with the injection of dry gas.

According to another particularity of the present invention, during the drying and degassing of each section, the interior of the inner pipe is dried and degassed simultaneously with the space between the inner pipe and the outer pipe thanks to two types of plug attached to each section, a first plug closing a first end of the section by making the interior of the inner pipe communicate with the space between the inner pipe and the outer pipe whereas the second plug comprises at least a first mouth facing the space between the inner pipe and the outer pipe, the first mouth being separated from a second mouth opening facing the interior of the inner pipe, one of these mouths being intended for pumping and these mouths being closed after pumping.

Another object of the present invention concerns a laying device for a subsea pipeline for the transport of a fluid comprising an inner casing arranged coaxially in an outer casing thereby delimiting an annulus, the pipeline being formed of straight sections each comprising an inner pipe arranged, thanks to positioning and thermal insulation elements, coaxially in an outer pipe, the laying device comprising a S-laying or J-laying pipe-laying ship for the welding of the sections and bulkheads positioned between two successive portions of pipeline, the bulkheads delimiting, between each other, closed parts of the annulus, wherein it comprises:

a tool for the onshore drying and degassing of at least the space between the inner pipe and the outer pipe of each section, a tool for the onshore installation of plugs to close the ends of each section able to temporarily close at least the space between the inner pipe and the outer pipe of each section, a tool, onboard the pipe-laying ship, able to separate each section from its plugs, a tool, onboard the pipe-laying ship, able to perform a short pumping operation via at least one opening leading to the part of the annulus located between the last installed bulkhead and the previous one, in order for the pressure to be reduced, a tool, onboard the pipe-laying ship, able to seal said opening leading to the part of the annulus.

According to another particularity of the present invention, the tool for the onshore drying and degassing comprises at least one suction pump to draw the air from the space between the inner pipe and the outer pipe of each section.

According to another particularity of the present invention, the tool for the onshore drying and degassing comprises a dry gas supply valve, the valve and pump being controlled by a control module so as to perform the pumping operation simultaneously with the injection of dry gas.

According to another particularity the laying device according to present invention comprises two types of plug to be fitted to two opposing ends of the same section, a first type of plug being arranged so as to close the end of the section while making the interior of the inner pipe communicate with the space between the inner pipe and the outer pipe, a second type of plug comprising a first mouth opening facing the space between the inner pipe and the outer pipe, the first mouth being separated from a second mouth opening facing the interior of the inner pipe, one of these mouths being able to be linked to the pump and caps enabling these mouths to be closed.

According to another particularity of the present invention, said opening leading to the part of the pressure-reduced annulus is made in a ring-shaped plate of each bulkhead further comprising an inner cylindrical portion and an outer cylindrical portion integral with the ring-shaped plate.

A first advantage lies in that the sub-sea pipeline can be installed in an acceptable length of time and in a manner providing good thermal insulation.

Another advantage of the present invention lies in the fact that the laying techniques and the material used for the laying operation are little changed.

Another advantage of the present invention is that the plugs may be recovered and reused. The plugs, which are welded temporarily by their cylindrical part to the sections and whose mouth(s) are made in their circular part, may advantageously be reused, since the pumping mouths are not damaged during the separation of the plugs by desoldering the sections.

BRIEF DESCRIPTION OF THE DRAWINGS

Other characteristics, advantages and particulars of the invention will become more apparent from the additional explanation given hereafter of the different embodiments given by way of example and with respect to the drawings, in which.

DETAILED DESCRIPTION OF PREFERRED EMBODIMENTS

Figure 10:
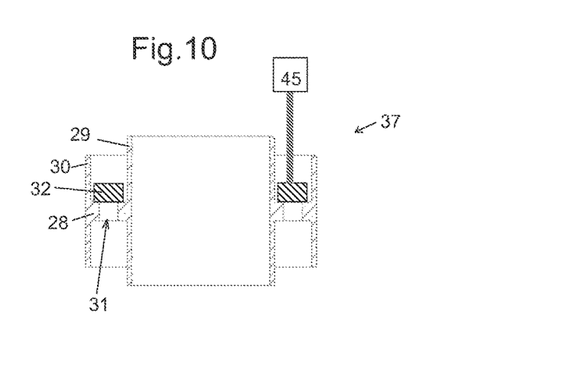
FIG. 10 shows a section view of a bulkhead.
Figure 11:
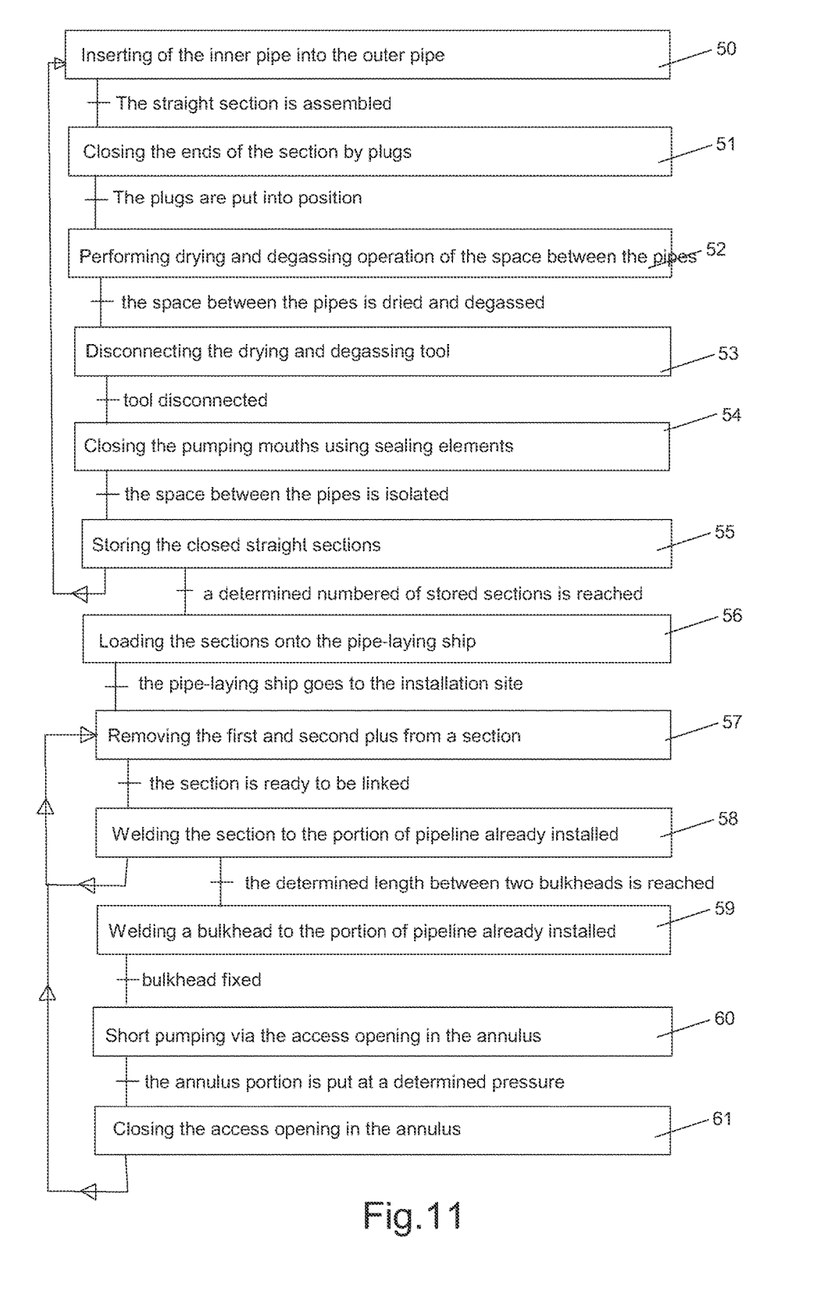
FIG. 11 shows an example of the laying process according to the invention.

The invention will now be described in greater detail. FIG. 11 shows, in general terms, a laying process for a Pipe-in-Pipe according to the invention, FIGS. 1 to 10 being an example illustrating steps 50 to 61 of this process.

Figure 1:
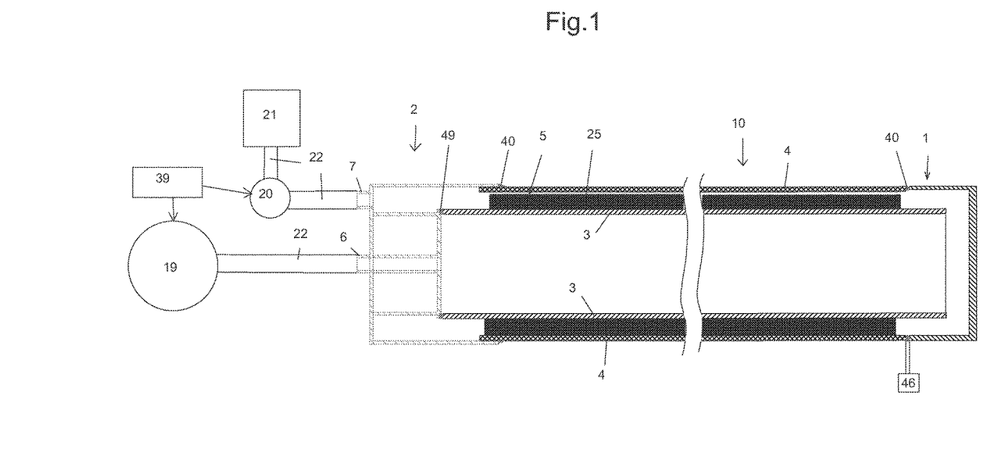
FIG. 1 shows a longitudinal section view of a section fitted with two types of plugs.

For the assembly 50 of a section, onshore, the outer pipe 4 is placed around the inner pipe 3 and concentrically aligned by means of the panels 25 of insulating material. The panels 25 of insulating material are arranged around the inner pipe 3. The insulating material 25 is, for example, IZOFLEX®. The pipes may also be concentrically aligned by means of spacers. In the event that IZOFLEX® is used for concentric alignment, the pipes are generally slightly off-center with respect to one another.

A space 5 open at the two ends of the section 10 is thus delimited between the inner pipe 3 and the outer pipe 4. The inner pipe 3 is able to slide, along its axis, with respect to the outer pipe 4. The straight section 10 is, for example, of a length of around 12 m, 24 m, 48 m, 72 m or 96 m.

After the straight section has been assembled, during step 51, the ends of the section are closed by plugs 1 and 2. These plugs close at least the space 5 between the inner pipe 3 and the outer pipe 4 of the section. A pumping mouth 7 is provided to access the space 5 between the inner pipe 3 and the outer pipe 4 of the section and enables the pressure in it to be reduced.

The plugs are, for example, put into place onshore. The plus are, for example, arranged manually at the ends of the section and welded by a welding station 46.

In FIG. 1, two types of plug are arranged at the ends of the section. A first plug 1, shown in FIG. 2, closes a first end of the section 10 by making the inside of the inner pipe 3 communicate with the space 5 between the inner pipe 3 and the outer pipe 4. The first plug 1 is welded at the end of the outer pipe 4.

The plugs are, for example, held in place by weld spots 40. Plugs 1 or 2 can be welded end to end with the outer pipe 4 or joined onto the outer pipe 4 and then possibly welded or glued to the outer pipe 4. Sealing is performed, for example, by putty or adhesive tape or welding around the periphery.

Figure 2:
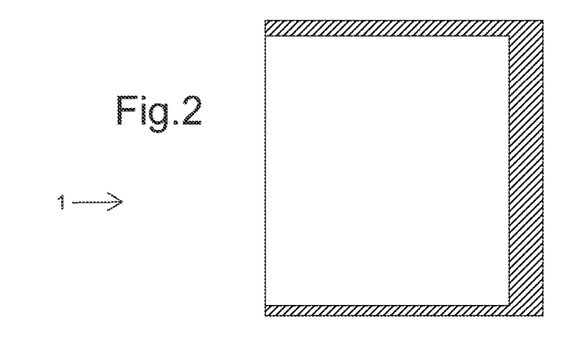
FIG. 2 shows a section view of a first type of plug.

The first plug 1 is in the form of a cylinder of a diameter adapted to the diameter of the outer pipe 4 and whose end is closed by a circular plate.

A second plug 2 is arranged at the opposing end of the section 10. The second plug 2, shown in FIGS. 3 and 4, comprises a first pumping mouth 7 which opens facing the space 5 between the inner pipe 3 and the outer pipe 4.

Figure 3:
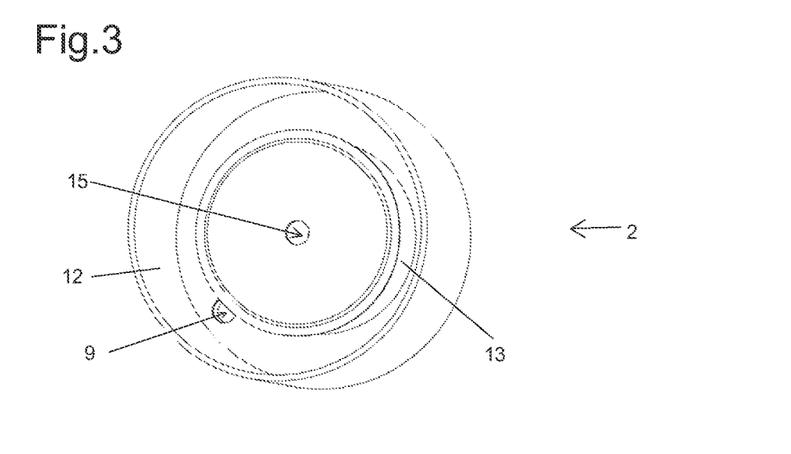
FIG. 3 shows a perspective view of a second type of plug.
Figure 4:
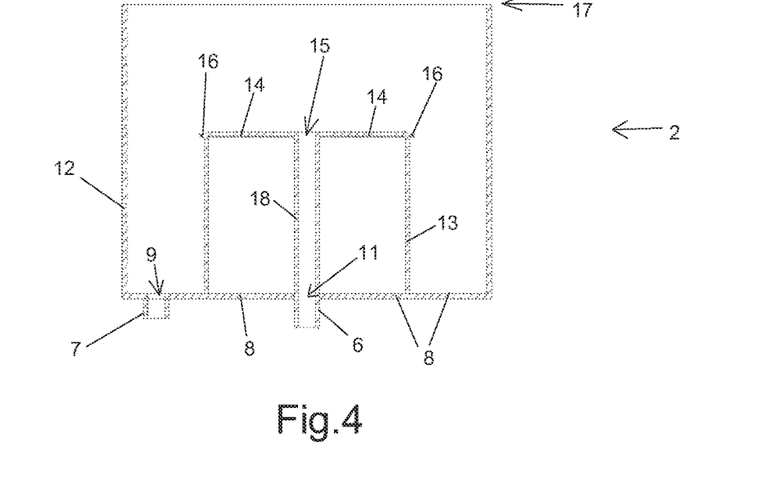
FIG. 4 shows a section view of a second type of plug.

The second plug 2 comprises a second pumping mouth 6 which opens facing the inside of the inner pipe 3. The first and second pumping mouths 6 and 7 are separated from one another.

The first mouth 7, for example, provides an inlet for dry gas, whereas the second mouth 6 is linked to a pump 19. The dry gas inlet can be controlled by a valve 20 or the dry gas inlet can be performed by controlled leakage.

Thus, a dry gas may be injected, simultaneously with an air suction operation, in space 5 arranged between the inner pipe 3 and the outer pipe 4. The non-occupied part of space 5 delimited by the inner pipe 3 and the outer pipe 4 facilitates an air current to flow improving drying and degassing inside this space 5.

The suction in the inner space in the inner pipe 3 namely enables the plugs to be kept tight against the section.

When the pumping operation is finished, the second plug may be replaced by a plug of the first type fixed by welding.

It is also possible to fix by welding the second plug to the section and close the pumping mouths, at the end of the pumping operation.

As shown in FIG. 4, the second plug comprises a circular plate 8 comprising two openings 9 and 11 corresponding to the first and second pumping mouths 6 and 7. This plate 8 is attached to an external cylindrical portion 12 and an internal cylindrical portion 13 between which the second pumping mouth 7 opens out.

Pumping mouths 6 and 7 each comprise a collar to facilitate their connection to a pipe.

The internal cylindrical portion 13 ends by a circular plate 14 comprising an opening 15 that corresponds to the first mouth 6. This circular plate 14 delimits a flange 16 pressing on the inner pipe 3 of the section. A rubber seal 49 may be arranged on the flange 16 to improve the airtightness of the contact. This plate 14 is set back with respect to the end 17 of the external cylindrical portion 12 of the second plug 2.

The second plug 2 additionally comprises a cylindrical portion 18 linking openings 11 and 15 corresponding to the first mouth 6 and made in the plates 8 and 15.

After the plugs have been put in place, during step 52, the space 5 between the inner pipe 3 and the outer pipe 4 of the section 10 is dried and degassed, onshore. An onshore drying tool enables at least the space 5 between the inner pipe 3 and the outer pipe 4 of each section to be dried and degassed. Degassing consists suctioning out the gaseous particles adsorbed by the walls inside the section.

As shown in FIG. 1, the drying and degassing tool comprises a suction pump 19 linked by a duct 22 to a first pumping mouth 6 of the second plug 2 so as to suction the space 5 of the section.

The drying tool namely comprises a dry gas supply valve 40 linked by a duct 22 to the second pumping mouth 7. The valve 20 may be supplied by the surrounding air or by a tank 21 containing dry gas. The pump 19 and valve 20 may be controlled synchronously by a control module 39 so as to provide suction simultaneously with the injection of dry gas. The pump 19 is, for example, activated when the valve 20 is controlled in an opened state and the pump 19 is deactivated when the valve 20 is controlled in a closed state.

The dry gas may also come from the surrounding environment in which the section is placed during the drying and degassing operations. The pumping mouth by which the gas penetrates may, in that case, be left open during pumping and closed after the drying and degassing of the section. The dry gas thus penetrates in the section by controlled leakage.

The first and second types of plug enable the interior of the inner pipe 3 and the space 5 between the inner pipe 3 and the outer pipe 4 to be dried and degassed at the same time.

The fact of introducing dry gas simultaneously with the air suction allows an air flow to be created that enables the section to be dried and degassed more quickly.

The drying and degassing time for a section is, for example, of between 10 h and 40 h.

It is also possible to dry and degas only the space 5 arranged between the inner pipe 3 and the outer pipe 4.

Figure 5:
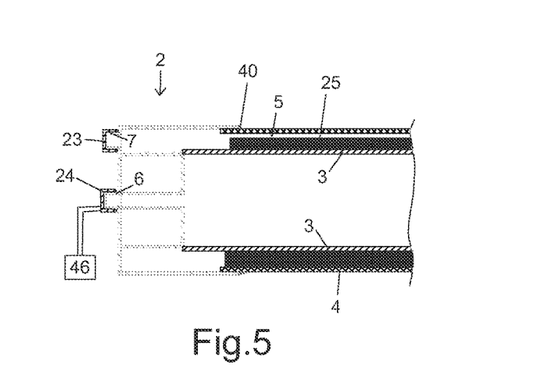
FIG. 5 shows an end of the section in FIG. 1 fitted with a plug with its two pumping mouths closed.

After the drying and degassing of the space 5 between the inner pipe 3 and outer pipe 4, the drying and degassing tool is disconnected, during step 53, then the pumping mouths 6 and 7 are closed by sealing elements, during step 54. As shown in FIG. 5, sealing elements 23 and 24 are in the form of caps fitted over the pumping mouths 6 and 7 and made integral with the second plug 2, by tool 46. This tool 46, for example, performs welding. This tool may also attach the caps 23 and 24 by gluing or screwing.

The section thus prepared, with its space 5 between the pipes now dried and degassed, is then put aside and stored, during step 55.

Step 50 for the assembly of a new section is performed once again, and so forth, until the required number of stored sections is reached.

During step 56, the sections are loaded onto a pipe-laying ship.

Figure 6:
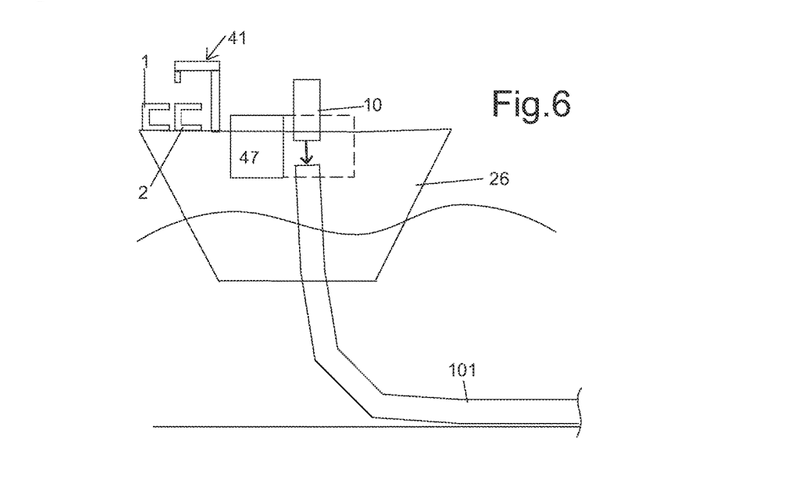
FIG. 6 schematically shows the laying of a pipe using the J-lay method.
Figure 7:
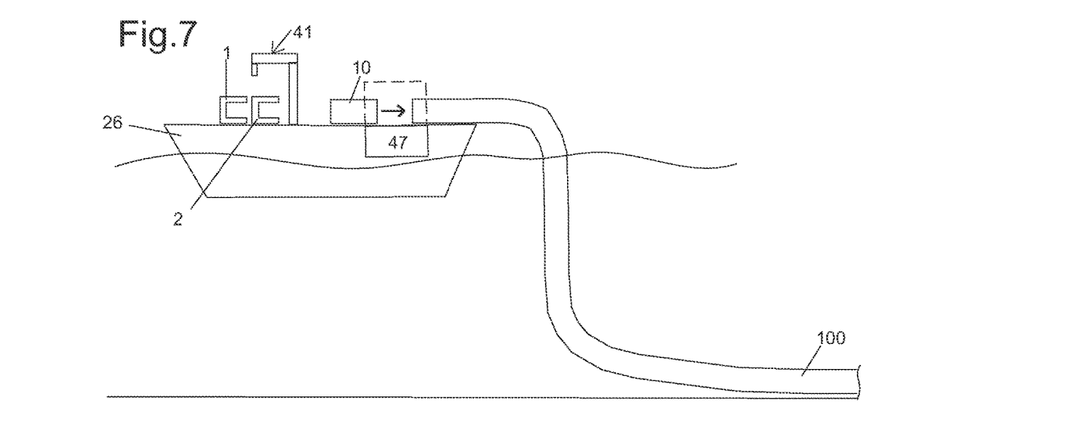
FIG. 7 schematically shows the laying of a pipe using the S-lay method.

After being loaded, the laying ship 26 goes to the site where the Pipe-in-Pipe is to be laid. FIG. 6 schematically illustrates a J-lay. FIG. 7 schematically illustrates an S-lay.

A tool 41, on board the ship, is able to separate each section from its plugs 1 and 2. This tool 41 namely comprises a grinder enabling the filler metal 40 forming the weld to be removed.

The plugs are thus removed, during step 57, prior to the attachment of a section of the portion of pipeline 100 or 101 already installed.

After the plugs have been removed, the section 10 is ready to be linked. The section is thus fixed to the portion of pipeline already installed, during step 58. The section may be fixed to another section or to a bulkhead.

The sections welded end to end between two bulkheads extend for a length, for example, of between 500 m and 3 km. If this length taken from the last bulkhead is reached a bulkhead is attached to the portion of pipeline already installed during step 59.

A bulkhead is attached using an onboard linking tool 47 and namely a welding tool.

Figure 8:
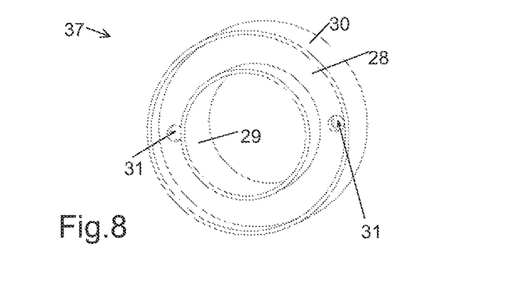
FIG. 8 shows a top view of a reinforcement ring, also called bulkhead.

A bulkhead 37 is shown in FIG. 8. The bulkhead 37 comprises an annular plate 28 attached to two cylindrical portions 29 and 30. The annular plate 28 comprises openings 31 to access the annulus enabling its pressure to be reduced.

The point (s) of access may also be made directly in the outer pipe of the Pipe-in-Pipe, but this would require such point (s) of access to be closed by sealing elements with high enough mechanical strength with respect to the mechanical strength of the outer pipe and this would further require the external coating to be renewed over the top of such sealing elements for the point(s) of access. The embodiment in which the point (s) of access to the annulus are made in the bulkhead is thus preferred, as sealing in this case is less complex, thereby gaining time and reducing costs.

After the bulkhead has been attached, a short pumping operation is performed, during step 60, via the openings 31 arranged in the last bulkhead 37 to reduce the pressure in part 35 of the annulus located between this bulkhead 37 and the previous one 38.

Figure 9:
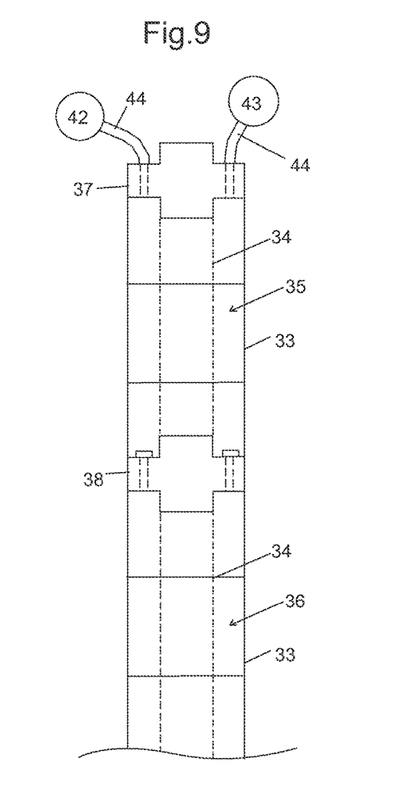
FIG. 9 shows the implementation of the short term pumping carried out on the pipe-laying ship.

A tool, onboard the pipe-laying ship, is able to perform this short pumping operation. This pressure-reducing tool, as shown in FIG. 9, comprises a pump 42 linked by a duct 44 to opening 31 to reduce the pressure and a manometer 43 enabling the pressure in the annulus 35 to be measured linked by a duct 44 to the other opening 31 for the pressure to be reduced.

As explained previously, the access opening(s) in the annulus may also be made in the outer pipe 4 to enable the pressure to be reduced before being sealed.

A pump may also be provided linked to the annulus as well as to a determined gas supply valve for the annulus so as to control the nature of the gas in the annulus.

After the part of the annulus 35 arranged between the last bulkhead 37 and the previous one 38 has been reduced in pressure, the openings 31 to enable such reduction in pressure are sealed, during step 61. These openings 31 sealed by sealing elements 32 are shown in FIG. 10. These sealing elements 32 are, for example, welded, glued or screwed onto the bulkhead 37.

A tool 45, onboard the pipe-laying ship, is able to seal the openings 31 made in each bulkhead 37.

We then jump to step 57 and separate the plugs from a new section.

Each of the parts of the annulus located between the successive bulkheads may thus be put under reduced pressure by a short pumping operation. The duration of each pumping operation is, for example, of between 1 h and 6 h. The pressures reached in the annulus may thus be below 100 mbars or below 30 mbars or even below 10 mbars.

It will be obvious for one skilled in the art that the present invention enables other variant embodiments. Consequently, the present embodiments shall be considered as merely illustrative of the invention.

What is claimed is:

1. A laying process for a subsea pipeline using a J-lay or S-lay method pipe-laying ship, the pipeline being used to transport fluid and being formed of straight sections, the process comprising:
   mounting the straight sections onshore, each straight section comprising an inner pipe coaxially arranged using positioning and thermal insulation elements inside an outer pipe, a space disposed between the inner pipe and the outer pipe,
   drying and degassing the space between the inner pipe and the outer pipe of each straight section,
   after drying and degassing, placing a plug at each end of each straight section to temporarily close the space between the inner pipe and the outer pipe,
   loading the straight sections onto the J-lay or S-lay method pipe-laying ship,
   removing the plugs before welding the straight sections together,
   welding the straight sections end to end, at sea, in order to form portions of pipeline, a first bulkhead and a second bulkhead being welded at two opposing ends of the portions of the pipeline, an annulus being formed in the portions of pipeline between the first bulkhead and the second bulkhead,
   after the welding of the first and second bulkheads, executing a short pumping operation to reduce the pressure in the annulus, and
   sealing an access opening in the annulus.

2. The laying process according to claim 1, further comprising putting the annulus under low pressure by a short pumping operation.

3. The laying process according to claim 1, wherein the drying and degassing of the space includes pumping the air from the space.

4. The laying process according to claim 3, wherein the drying and degassing of the space includes injecting dry gas into the space simultaneously while pumping the air from the space.

5. The laying process according to claim 3, wherein the plugs at each end of each straight section include a first plug closing a first end of the straight section and a second plug closing a second end of the straight section,
   the first plug causing an interior of the inner pipe to communicate with the space, and
   the second plug including a first mouth and a second mouth, the first mouth facing the space and being separated from the second mouth, the second mouth including an opening that faces the interior of the inner pipe, one of the first mouth and the second mouth being configured for pumping and the one of the first mouth and the second mouth being closed after pumping.

6. A laying device for a subsea pipeline that transports fluid,
   the pipeline being formed of straight sections that each include an inner pipe arranged coaxially in an outer pipe as a result of positioning elements and thermal insulation elements, a space disposed between the inner pipe and the outer pipe,
   the device including a S-laying or J-laying pipe-laving ship for the welding of the sections and bulkheads positioned between two successive portions of pipeline, the bulkheads delimiting, between each other, closed parts of the annulus
   the device further comprising:
   a first tool configured for onshore drying and degassing of the space between the inner pipe and the outer pipe,
   a second tool configured for onshore installation of plugs to close the ends of each straight section to temporarily close the space between the inner pipe and the outer pipe,
   a third tool onboard the pipe laying ship, configured for separating each section from the plugs,
   a fourth tool onboard the pipe laying ship, configured for performing a short pumping operation via at least one opening in a bulkhead, the bulkhead being welded at an end of a straight section such that an annulus is formed in the straight section, the short pumping operation reducing pressure in the annulus, and
   a fifth tool onboard the pipe laying ship, configured for sealing an opening in the annulus.

7. The device according to claim 6, wherein the first tool includes at least one suction pump to draw the air from the space.

8. The device according to claim 7, wherein the first tool includes a dry gas supply valve, the supply valve and the suction pump being controlled by a control module so as to perform a pumping operation simultaneously with an injection of dry gas into the space.

9. The device according to claim 7, wherein the plugs include a first plug that is arranged so as to close a first end of the straight section and a second plug that is arranged to close a second end of the straight section,
   the first plug causing an interior of the inner pipe to communicate with the space, and
   the second plug including a first mouth and a second mouth, the first mouth facing the space and being separated from the second mouth, the second mouth including an opening that faces the interior of the inner pipe, one of the first mouth and the second mouth being configured to pump, the one of the first mouth and the second mouth being closeable with a cap.

10. The device according to claim 6, wherein the opening in the bulkhead is made in a ring-shaped plate and includes an inner cylindrical portion and an outer cylindrical portion integral with the ring-shaped plate.

* * * * *